(12) United States Patent
Goswami et al.

(10) Patent No.: US 12,086,275 B2
(45) Date of Patent: Sep. 10, 2024

(54) INTELLIGENT PRIVACY DATA GOVERNANCE SYSTEM

(71) Applicant: Accenture Global Solutions Limited, Dublin (IE)

(72) Inventors: Trisha Goswami, West Bengal (IN); Ashraf AlZanoun, Chicago, IL (US); Lisa Suzanne Wilson, Chicago, IL (US); Tegbir Singh Harika, Plano, TX (US); Arun Ravindran, Bangalore (IN); Jayanti Vemulapati, Gopanpally (IN)

(73) Assignee: Accenture Global Solutions Limited, Dublin (IE)

( * ) Notice: Subject to any disclaimer, the term of this patent is extended or adjusted under 35 U.S.C. 154(b) by 269 days.

(21) Appl. No.: 17/459,332

(22) Filed: Aug. 27, 2021

(65) Prior Publication Data

US 2022/0179979 A1 Jun. 9, 2022

Related U.S. Application Data

(60) Provisional application No. 63/122,713, filed on Dec. 8, 2020.

(51) Int. Cl.
*H04L 29/00* (2006.01)
*G06F 11/14* (2006.01)
(Continued)

(52) U.S. Cl.
CPC ........ *G06F 21/604* (2013.01); *G06F 11/1451* (2013.01); *G06F 16/245* (2019.01);
(Continued)

(58) Field of Classification Search
CPC .. G06F 21/604; G06F 11/1451; G06F 16/245; G06F 40/40; G06F 2201/82;
(Continued)

(56) References Cited

U.S. PATENT DOCUMENTS 8,271,894 B1 * 9/2012 Mayers ................. G06F 3/0481
 715/765
9,058,813 B1 6/2015 Blanksteen
(Continued)

OTHER PUBLICATIONS

Extended Search Report for European Application No. 21194608.2 dated Feb. 11, 2022 (09 Pages).

*Primary Examiner* — Don G Zhao
(74) *Attorney, Agent, or Firm* — Polsinelli P.C.

(57) ABSTRACT

A system for governing user privacy data may include detecting a dark data source in a data ecosystem including data sources storing user privacy data. The system may further include identifying user information from the data ecosystem according to a lineage of datasets and scanning the dark data source by executing a natural language processing engine to identify existence of and content of user privacy data in the dark data source based on the user information. The system may further include selecting a target user privacy data compliance policy from user privacy data compliance policies based on a geographical region associated with the dark data source and detecting non-compliance in protecting the user privacy data in the dark data source based on the target user privacy data compliance policy. The system may further include, in response to the non-compliance, processing the user privacy data to eliminate the non-compliance.

18 Claims, 7 Drawing Sheets

(51) Int. Cl.
*G06F 16/245* (2019.01)
*G06F 21/60* (2013.01)
*G06F 40/40* (2020.01)

(52) U.S. Cl.
CPC .......... *G06F 40/40* (2020.01); *G06F 2201/82* (2013.01); *G06F 2221/2107* (2013.01); *G06F 2221/2111* (2013.01)

(58) Field of Classification Search
CPC ..... G06F 2221/2107; G06F 2221/2111; G06F 21/6245; G06F 21/6254; H04L 63/0407; H04L 63/0421; H04W 12/02
See application file for complete search history.

(56) References Cited

U.S. PATENT DOCUMENTS

| | | | |
|---|---|---|---|
| 9,253,631 B1* | 2/2016 | White | H04M 1/72457 |
| 10,630,677 B1* | 4/2020 | Li | H04L 63/1491 |
| 11,423,175 B1* | 8/2022 | Mahajan | G06T 5/002 |
| 11,567,975 B1* | 1/2023 | Day, Jr. | G06F 21/6254 |
| 2013/0014279 A1* | 1/2013 | Leland | G06F 21/6245 726/28 |
| 2016/0188904 A1* | 6/2016 | Singh | G06F 21/6245 726/27 |
| 2017/0105118 A1* | 4/2017 | Lee | H04W 12/02 |
| 2017/0255786 A1* | 9/2017 | Krishnamurthi | G06F 21/32 |
| 2018/0082068 A1* | 3/2018 | Lancioni | G06F 21/84 |
| 2018/0307859 A1* | 10/2018 | LaFever | H04L 63/20 |
| 2018/0329245 A1* | 11/2018 | Robinson | G02F 1/134309 |
| 2019/0086706 A1* | 3/2019 | Robinson | G02F 1/133634 |
| 2019/0166153 A1* | 5/2019 | Steele | H04L 63/1441 |
| 2019/0332807 A1* | 10/2019 | LaFever | G06F 21/6254 |
| 2019/0370492 A1* | 12/2019 | Falchuk | H04W 12/02 |
| 2020/0082813 A1 | 3/2020 | Rudden et al. | |
| 2020/0136831 A1* | 4/2020 | Danielson | H04L 9/0643 |
| 2020/0304477 A1* | 9/2020 | Venkataraman | H04L 12/4633 |
| 2020/0311233 A1* | 10/2020 | Brannon | G06F 21/316 |
| 2022/0067185 A1* | 3/2022 | Chikoti | G06F 16/35 |
| 2022/0067294 A1* | 3/2022 | Chikoti | G06F 40/253 |
| 2022/0261494 A1* | 8/2022 | Truong | G06F 18/2132 |
| 2022/0343006 A1* | 10/2022 | Ceballos Melo | G06F 21/6245 |
| 2022/0353087 A1* | 11/2022 | Asharov | H04L 63/0428 |
| 2023/0012574 A1* | 1/2023 | Azam | G06F 21/6245 |
| 2023/0054446 A1* | 2/2023 | LaFever | H04W 12/75 |

* cited by examiner

Dashboard > PII Scanner

PII Scanner  Org: XYZ  |Sub Org: XYZ Consulting ▸  |Environment: Production ▸   ↻ Start New Scan  Scheduling

OVERALL STATUS  SCAN ID 41 |SELECT SCAN  2020-09-02, 41-Fullscan ▸  Download Logs  Stop Scan Content Source Scanning — Dark Data Detection For Infrastructure — Dark Data Detection For Source Systems — Metrics Aggregation — Completed

| | Content Source Scanning | Dark Data Detection For Infrastructure | Dark Data Detection For Source Systems | Metrics Aggregation |
|---|---|---|---|---|
| START TIME | 2020-09-02 05:10:46 | 2020-09-02 05:13:25 | 2020-09-02 05:13:31 | 2020-09-02 05:13:49 |
| END TIME | 2020-09-02 05:13:49 | 2020-09-02 05:13:31 | 2020-09-02 05:13:49 | 2020-09-02 05:13:49 |
| DURATION | 3 minutes 3 seconds | 6 seconds | 18 seconds | 0 seconds |

| | | | | Completed |
|---|---|---|---|---|
| | | | | START TIME 2020-09-02 05:10:48 |
| | | | | END TIME 2020-09-02 05:13:49 |
| | | | | DURATION 3 minute 3 seconds |

^^All time is in UTC timezone

| Content Source Name | Scan Status (Completed/Error) | Backup Status | Encryption | Metadata Retrieved |
|---|---|---|---|---|
| AWS S3 | Completed 4/0 | Completed | Completed | NA |
| MySQL on EC2 | Completed 137/0 | Completed | Completed | Completed |

First Previous 1 Next Last

FIG. 4

Dashboard > Compliance Dashboard > Backup Status (Source System)

Backup Status (Source System)     Org:  XYZ   | Sub Org:  All |  Environment:  All          PII Scan Date| 2020-08-02  ▶

Registered Source Systems | Backed Up | Not Backed Up
5 = 2 + 3

⊙ Backed Up       2
☐ Not Backed Up   3

Backed Up Source System

| Source System Name | Nodes | Source System Type | Sub Org | Environment |
|---|---|---|---|---|
| MySQL on EC2 | ① | MySQL | XYZ Consulting | Production |
| Postgres on EC2 | ① | PostgreSQL | XYZ Technology | Production-Technology |

First Previous 1 Next Last

FIG. 5

Dashboard > Activity Log

Activity Log
From ☐  To ☐

Sub-Organization    Environment    Users    Search
[Select ▸]          [Select ▸]     [Select ▸]   [Search by ▸]   [Search]

2020-03-31

| 12:22 | Accessed Individual Rights Requests History |
| | SUB ORG        ENVIRONMENT |
| | ALL            ALL |
| | Client_Admin |

| 12:21 | Accessed Source System Detection (Dark Data) |
| | SUB ORG        ENVIRONMENT |
| | ALL            ALL |
| | Client_Admin |

| 12:21 | Accessed Compliance Dashboard |
| | SUB ORG        ENVIRONMENT |
| | ALL            ALL |
| | Client_Admin |

FIG. 6 the processor may be configured to detect a dark data source in a data ecosystem. The data ecosystem may include a plurality of data sources storing user privacy data. The dark data source may represent at least one data source of the plurality of data sources in which it is unknown whether user privacy data is stored. The at least one data source may include a plurality of datasets. The processor may be further configured to identify user information and relationship from the data ecosystem according to a lineage of datasets. The processor may be further configured to scan the dark data source by executing a natural language processing engine to identify existence of and content of user privacy data in the dark data source based on the user information and relationship. The processor may be further configured to select a target user privacy data compliance policy from a plurality of user privacy data compliance policies based on a geographical region associated with the dark data source and detect non-compliance in protecting the user privacy data in the dark data source based on the target user privacy data compliance policy. The processor may be further configured to, in response to the non-compliance, process the user privacy data to eliminate the non-compliance.

INTELLIGENT PRIVACY DATA GOVERNANCE SYSTEM

RELATED APPLICATION

This application claims priority to U.S. Provisional Patent Application No. 63/122,713, entitled "INTELLIGENT DATA GOVERNANCE SERVICES" filed on Dec. 8, 2020, wherein the entirety of the above-referenced application is incorporated herein by reference.

TECHNICAL FIELD

This application generally relates to the protection of user privacy data. In particular, this application describes a method and system for governing user privacy data to comply with various data privacy regulations.

BACKGROUND

In the past few years, general customer dissatisfaction, erosion of trust and privacy invasion are increasing. There is wide societal pressure toward privacy protection and a more responsible use of data. More than 60 countries have enforced privacy laws in response to citizens' cry for transparency and control. Privacy data protection regulations globally follow a trend of increasing maturity and detail, representing risks in both business and personal impact. Organizations worldwide struggle to adapt their privacy data protection programs at a suitable pace especially when compliance is the sole focus.

SUMMARY

This disclosure relates to methods and systems for governing user privacy data to comply with various data privacy regulations.

In one embodiment, a method for governing user privacy data may include detecting, with a processor circuitry, a dark data source in a data ecosystem. The data ecosystem may include a plurality of data sources storing user privacy data. The dark data source may represent at least one data source of the plurality of data sources in which it is unknown whether user privacy data is stored. The at least one data source may include a plurality of datasets. The method may further include identifying, with the processor circuitry, user information and relationship from the data ecosystem according to a lineage of datasets. The method may further include scanning, with the processor circuitry, the dark data source by executing a natural language processing engine to identify existence of and content of user privacy data in the dark data source based on the user information and relationship. The method may further include selecting, with the processor circuitry, a target user privacy data compliance policy from a plurality of user privacy data compliance policies based on a geographical region associated with the dark data source and detecting, with the processor circuitry, non-compliance in protecting the user privacy data in the dark data source based on the target user privacy data compliance policy. The method may further include, in response to the non-compliance, processing, with the processor circuitry, the user privacy data to eliminate the non-compliance.

In another embodiment, a system for governing user privacy data may include a memory having stored thereon executable instructions and a processor circuitry in communication with the memory. When executing the instructions, In another embodiment, a product for governing user privacy data is disclosed. The product may include machine-readable media other than a transitory signal and instructions stored on the machine-readable media. When being executed, the instructions may be configured to cause a processor to detect a dark data source in a data ecosystem. The data ecosystem may include a plurality of data sources storing user privacy data. The dark data source may represent at least one data source of the plurality of data sources in which it is unknown whether user privacy data is stored. The at least one data source may include a plurality of datasets. The instructions may be further configured to cause the processor to identify user information and relationship from the data ecosystem according to a lineage of datasets. The instructions may be further configured to cause the processor to scan the dark data source by executing a natural language processing engine to identify existence of and content of user privacy data in the dark data source based on the user information and relationship. The instructions may be further configured to cause the processor to select a target user privacy data compliance policy from a plurality of user privacy data compliance policies based on a geographical region associated with the dark data source and detect non-compliance in protecting the user privacy data in the dark data source based on the target user privacy data compliance policy. The instructions may be further configured to cause the processor to, in response to the non-compliance, process the user privacy data to eliminate the non-compliance.

One interesting feature of the systems and methods described below may be that it may warrant a continuous compliance in protecting user privacy data. In particular, it may dynamically detect new data sources that may store user privacy data, for example, by monitoring newly added data source to the data ecosystem. Then, the new data sources may be scanned for non-compliance based on a specific user privacy data compliance policy. Upon detecting the non-compliance, the systems and methods may process the user privacy data in the data sources to eliminate the non-compliance.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIG. 4 shows an exemplary scan status of dark data source in accordance with an embodiment.

FIG. 5 shows an exemplary backup status for user privacy data in accordance with an embodiment.

FIG. 6 shows an exemplary activity log of the privacy data governance system in accordance with an embodiment.

DETAILED DESCRIPTION

A data ecosystem in an organization may include numerous data sources used by different units in the organization. The data sources may include, for example, structured data storage, unstructured/semi-structured data storage, and big data storage. The structured data storage may include, for example, MySQL, MS SQL, PostgreSQL, Oracle, AWS RDS, AWS Redshift, Azure SQL database, Azure data warehouse, GCP cloud SQL, Google Bigquery, AWS Aurora DB, and Snowflake. The unstructured/semi-structured data storage may include file share, Shared Folders, CSV, JSON, XML, PARQUET, Windows File System, Unix File System, AWS S3, Azure file storage, Azure blob storage, Azure data lake storage (ADLS), and Google Storage. The big data storage may include, for example, Hadoop file systems (HDFS), AWS Amazon Elastic MapReduce (EMR).

User privacy data may be distributed in the data sources for different use purposes. The user privacy data may include, for example, personally identifiable information (PII), protected health information (PHI), sensitive personal data, and commercially sensitive data. The PII may include information which is related to one or more of: identified natural persons; personally identifiable information of natural persons; personally identifying information of natural persons; user specific information of natural persons that is or should be under the control of the user and otherwise not publically available; or some combination thereof. For example, PII may include data identifying a user such as a social security number, a driver license number, an employee identifier, data identifying characteristics about the user, data identifying the health status of the user, and the like. PII may include all individually identifiable health information, including demographic data, medical histories, test results, insurance information, and other information used to identify a patient or provide healthcare services or healthcare coverage.

Figure 1:
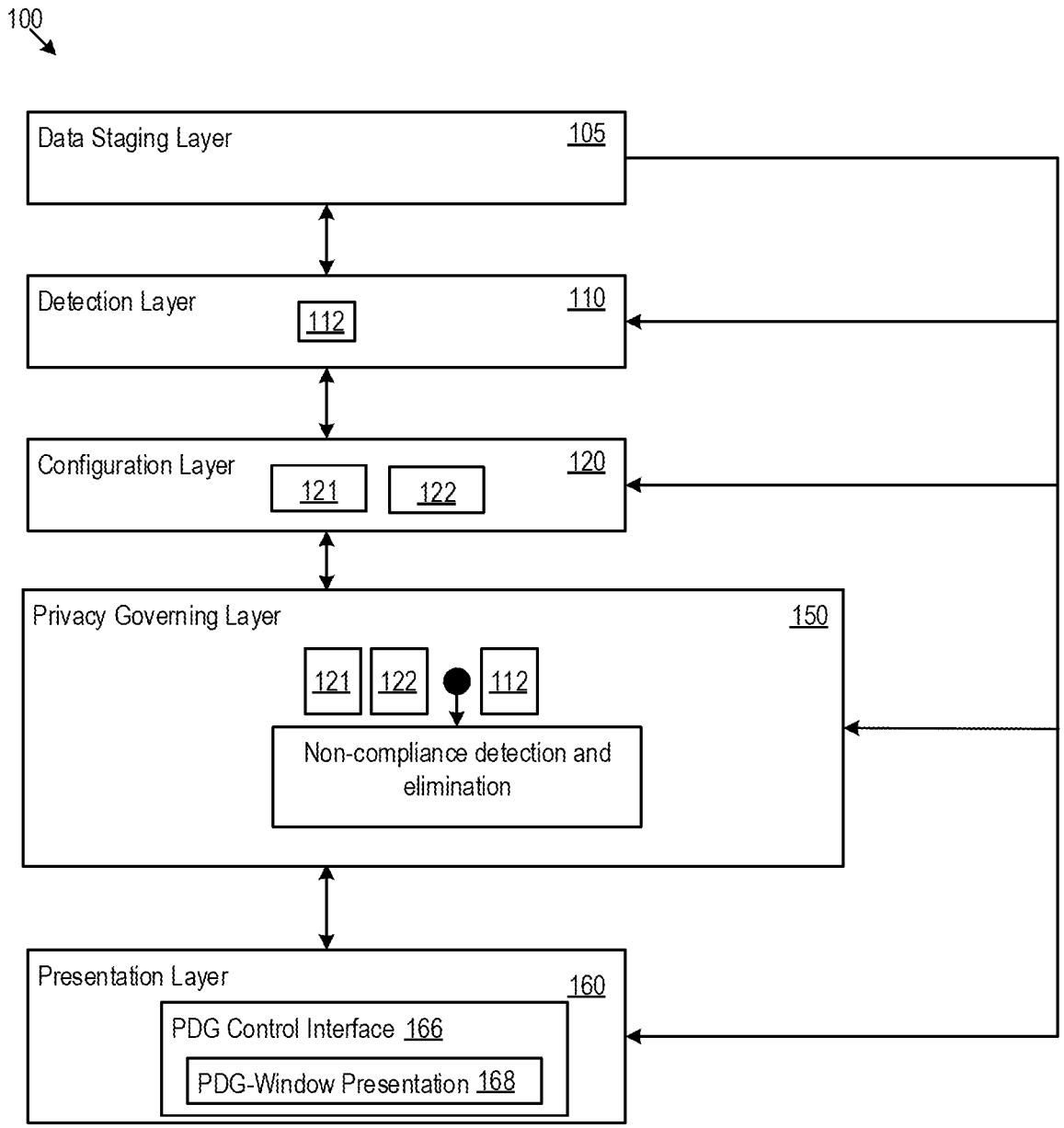
FIG. 1 shows an exemplary multiple-layer privacy data governance stack included in a privacy data governance system.

The user privacy data governance system in the present disclosure may facilitate an organization to effectively protect the user privacy data stored in the data ecosystem of the organization to comply with individual governmental data privacy protection regulations. FIG. 1 illustrates an exemplary multiple-layer user privacy data governance (PDG) stack 100 included in the user privacy data governance system. The user privacy data governance system described herein may use the PDG stack 100 to dynamically scan the data ecosystem to identify user privacy data distributed in the numerous data sources, detect the non-compliance in protecting the user privacy data under a specific data privacy protection regulation, and process the user privacy data to eliminate the non-compliance.

In this example, the PDG stack 100 may include a data staging layer 105, a detection layer 110, a configuration layer 120, a privacy governing layer 150, and a presentation layer 160. The PDG stack 100 may include a multiple-layer computing structure of hardware and software that may warrant compliance in storing and using user privacy data by dynamically scanning the data sources and analyzing and eliminating non-compliance.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the PDG stack 100, the data staging layer 105 may provide the system with storage resources to store ingested and generated data within a database or other data structure. In some implementations, the data staging layer 105 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 105 may provide a hardware resource, e.g., memory resources, to the system. Accordingly, the multiple-layer stack architecture of the PDG stack 100 may improve the functioning of the underlying hardware.

Figure 2:
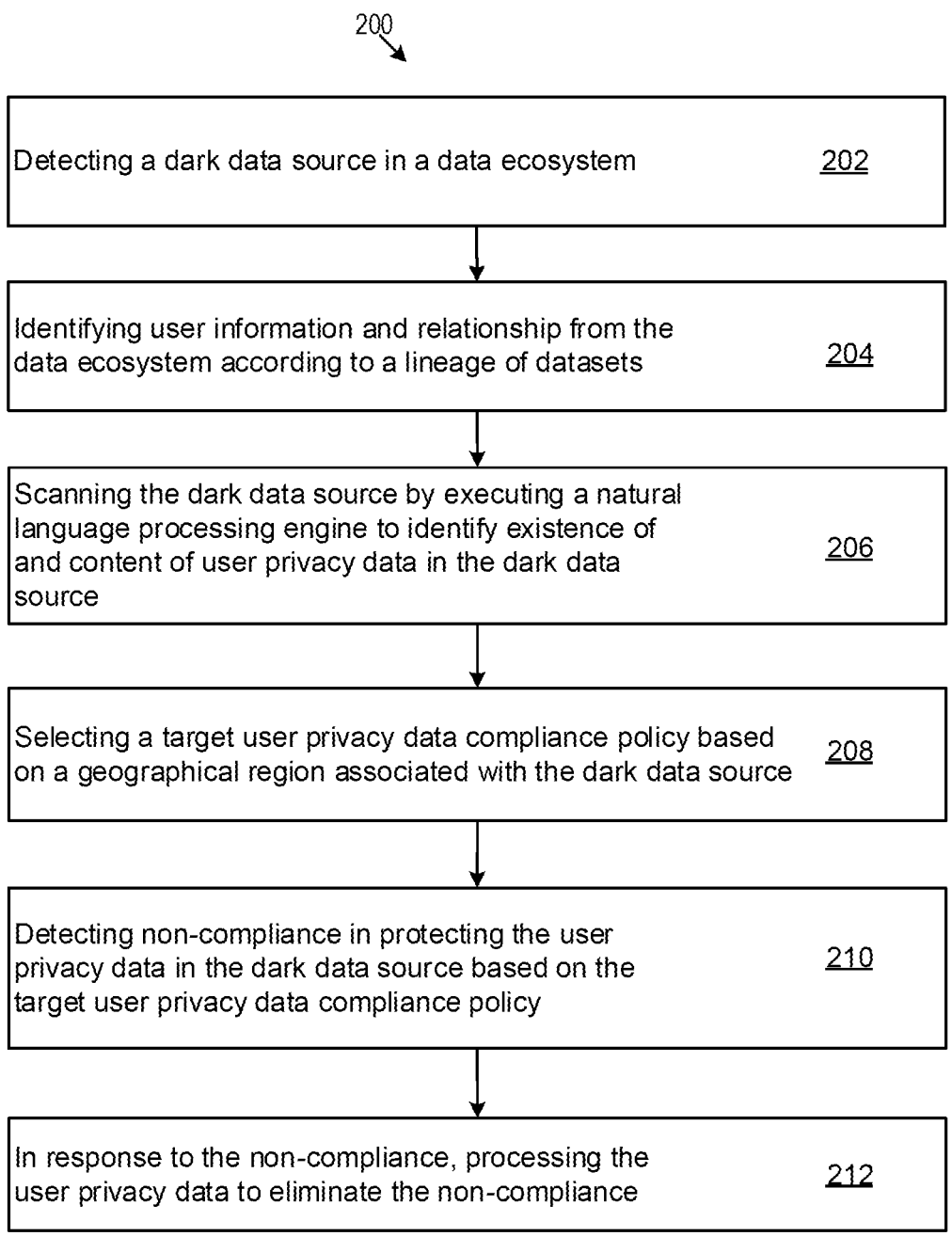
FIG. 2 shows an exemplary privacy data governance logic in accordance with an embodiment.

In the following, reference is made to FIG. 1 and an example PDG logic 200 in FIG. 2. It will be appreciated that the logical features of the example PDG logic 200 may be implemented in various orders and combinations. For example, in a first implementation, one or more features may be omitted or reordered with respect to a second implementation. At the detection layer 110 of the PDG stack 100, the PDG logic 200 may detect a dark data source 112 in the data ecosystem (202). The dark data source may, for example, represent one or more data sources of the numerous data sources in which it is unknown whether user privacy data is stored. The data source may a plurality of datasets. The datasets may, for example, represent containers that are used to organize and control access to database tables and views.

In an implementation, the PDG logic 200 may monitor data changes in the data ecosystem to determine if a new data source joins the data ecosystem. In response to the joining, the PDG logic 200 may take the new data source as the dark data source 112. In another implementation, the PDG logic 200 may monitor if a new dataset is created in an existing data source by periodically or non-periodically (e.g., hourly, six hours, daily, weekly, month-date, and yearly) scanning the data sources. In response to the creation, the PDG logic 200 may take the existing data source as the dark data source 112. In another implementation, the PDG logic 200 may scan the data ecosystem according to a predetermined scan time interval to identify a data source newly added to the data ecosystem and determine the newly added data source as the dark data source 112. The PDG logic 200 then may, at the detection layer 110, store the detection result of dark data sources 112 via a memory operation at the data staging layer 105.

At the configuration layer 120, the PDG logic 200 may identify user information and relationship 121 from the data ecosystem according to a lineage of datasets. The lineage of datasets may represent life cycle of data in the datasets that include the data origin, what happens to it and where it moves over time. By tracking the lineage, the PDG logic 200 may find the user information and relationship 121 distributed in the numerous datasets. In an example, the user information may include various characteristic information used to identify a user in the data ecosystem such as a user identifier, an identifier of group that the user belongs to, and a geographical location of the user. The user relationship may include, for example, business relationship and personal relationship, which may help to identify additional users whose privacy data need to be scanned.

At the configuration layer 120, the PDG logic 200 may also configure user privacy data tags 122 which may be used as keywords to scan the dark data source for user privacy data. For example, the PDG logic 200 may retrieve the predefined privacy data tags 122 from the system storage via the data staging layer 105. For another example, the PDG logic 20 may receive the customized privacy data tags 122 input by the system operator via a graphical user interface, for example, implemented at the present layer 160.

At the privacy governing layer 150, the PDG logic 200 may scan the dark data source by executing a natural language processing engine to identify existence of and content of user privacy data in the dark data source based on the identified user information and relationship 112 (206). The natural language processing engine may utilize statistical model, machine learning model, or deep learning model to analyze natural language data. In an implementation, the PDG logic 200 may determine the users whose user privacy data is to be scanned base on the identified user information and relationship 112. Then, the PDG logic 200 may input data from the dark data source to the natural language processing engine, which may analyze the input data to determine whether there is privacy data for the users. For example, the PDG logic 200 may identify the user privacy data based on privacy data tags 112 predefined in the system as shown in Table 1 and privacy data tags 112 configured at the configuration layer 120, as described above.

TABLE 1

Example privacy data tags for PII/PHI

| | | |
|---|---|---|
| Email | Religion | ICD9 Code |
| BIC_SWIFT Code | SSN General | ICD10 Code |
| Bank Routing Number | URL | Geocode_LatitudeLongitude |
| ABA | Zip code | Geocode_Longitude |
| Company Name | First name | Passport Number US |
| Computer Address | Full name | Maid |
| Credit Card Number | Gender | |
| IBAN | Last name | |
| IP Address | City | |
| Phone Number | Job | |
| Race | | |

At the privacy governing layer 150, the PDG logic 200 may select a target user privacy data compliance policy from a plurality of user privacy data compliance policies based on a geographical region associated with the dark data source (208). The global countries or regions may enforce different policies to protect user privacy data. Below is a list of example data compliance policies:

General Data Protection Regulation (GDPR)—European Union
California Consumer Privacy Act (CCPA)—United States
Personal Information Protection & Electronic Documents Act (PIPEDA)—Canada
General Data Protection Law—Brazil
Personal Data Protection Act (PDPA)—Thailand
Personal Data Protection Act (PDPA)—Singapore
Federal Data Protection Law 2000—Mexico
The Privacy Protection Act 2017 (PPA)—Israel
Protection Of Personal Information Act 2013 (POPI)—South Africa
Personal Data Protection Bill 2018—India In an implementation, the PDG logic 200 may determine the geographical region associated with the dark data source based on a geographical location where the dark data source is physically stored. For example, if the dark data source is physically stored in Germany, the PDG logic 200 may determine the geographical region associated with the dark data source to be European Union, and accordingly select the GDPR as the target user privacy data compliance policy. Alternatively or additionally, the PDG logic 200 may determine the geographical region associated with the dark data source based on a geographical location where the dark data source is accessed. For example, if the dark data source is being accessed from California, the PDG logic 200 may determine the geographical region associated with the dark data source to be the United States. As such, the PDG logic 200 may select the CCPA as the target user privacy data compliance policy.

At the privacy governing layer 150, the PDG logic 200 may detect non-compliance in protecting the user privacy data in the dark data source based on the target user privacy data compliance policy (210). In an implementation, the PDG logic 200 may retrieve the privacy data protection rules defined in the target user privacy data compliance policy from the data storage at the data staging layer 105. Then, the PDG logic 200 may apply the rules to the user privacy data to identify the non-compliance in storing and using the user privacy data. The non-compliance may include, for example, a failure to back up user privacy data, a failure to encrypt or mask user privacy data, a failure to set expiration date for using user privacy data, and the like.

When detecting the non-compliance, the PDG logic 200 may process the user privacy data to eliminate the non-compliance (212). In an example, the non-compliance is the failure to backup user privacy data. The PDG logic 200 may identify datasets including the user privacy data from the dark data source and generate backup datasets for the datasets including the user privacy data. For purpose of data safety, the PDG logic 200 may transfer the backup datasets to a different geographical location than the original datasets. In another example, the non-compliance is the failure to encrypt or mask user privacy data. The PDG logic 200 may identify datasets including the user privacy data from the dark data source and encrypt or mask the dataset including the user privacy data. The dataset encryption may, for example, represent a process of translating data stored in the dataset from plaintext (unencrypted) to ciphertext (encrypted). The encrypted data may be accessed with an encryption key. The dataset masking may, for example, represent a process of hiding original data with modified content (characters or other data).

Under a user privacy data compliance policy such as GDPR, individuals whose personal information is collected and/or used in Europe or collected from individuals located in Europe have the following rights over their personal information which is collected, stored and used:
right to be forgotten
right to rectification of their personal information
right to data portability
right to restriction of processing their personal information right to object to processing their personal information right to appropriate decision making The PDG logic 200 may effectively ensure the individual right requests to be processed by executing the individual right requests and validating completion of the individual right requests. In an example, when receiving an individual right request for a user privacy data, the PDG logic 200 may search the dark data source to identify a plurality of datasets to which the individual right request is applicable, execute operation on the plurality of datasets according to the individual right request; and validate a completion of the individual right request. For example, the individual right request is related to the right to rectification which involves correction of privacy data of the user. The PDG logic 200 may execute a corresponding update operation on the datasets including the privacy data and then query the datasets to validate that the privacy data has been corrected. In some implementations, the PDG logic 200 may maintain a periodic check on the storage and operation of user privacy data in the applicable datasets to ensure the compliance with the executed individual right request.

Moreover, consent is foundational to modern privacy compliance. For a growing number of privacy regulations worldwide, explicit consent from a user is needed to process their personal data. The consent may include consent opt-in and consent opt-out. The consent opt-in may grant a data collector to access the user privacy data while the consent opt-out may withdraw the grant to the data collector to access the user privacy data. The PDG stack 100 may maintain consent repository with the right amount of details to allow the demonstration of regulation compliance, for example, at the data staging layer 120. The PDG logic 200 may process the user's consent opt-in request and consent opt-out request with respect to their privacy data.

In an implementation, when processing a consent opt-in request for a user privacy data, the PDG logic 200 may determine a consent opt-out date for the user privacy data based on a consent opt-in request for the user privacy data. The consent opt-out date may represent the date when the grant to access to the user privacy data is withdrawn, i.e., an access expiration date. In an example, the PDG logic 200 may directly extract the consent opt-out date from the consent opt-in request. In another example, the PDG logic 200 may calculate the consent opt-out date based on the consent opt-in date in the consent opt-in request according to a predefined access expiration rule. Then, the PDG logic 200 may generate a consent opt-out request for the user privacy data based on the opt-out consent date. The generated consent opt-out request may ensure that the access grant to the user privacy data has to expire at some point, and thereby protecting the user privacy data.

Additionally, when receiving an operation request for a user privacy data from a request source such as a data collector, the PDG logic 200 may determine if the request source has access grant to the user privacy data. Where the access grant to the request source has been withdrawn, the PDG logic 200 may remove the user privacy data from the dataset to which the operation request is directed so as to protect the user privacy data.

Now referring to the presentation layer 160 in FIG. 1, where the PDG logic 200 may access the privacy data governance results from the privacy governing layer 150, e.g., via data staging layer 105 memory operations to generate a PDG-control interface 166 including a PDG-window presentation 168. The PDG-window presentation 168 may include data and/or selectable options related to the privacy data governance such as privacy data scanning and privacy data backup and encryption.

Figure 3:
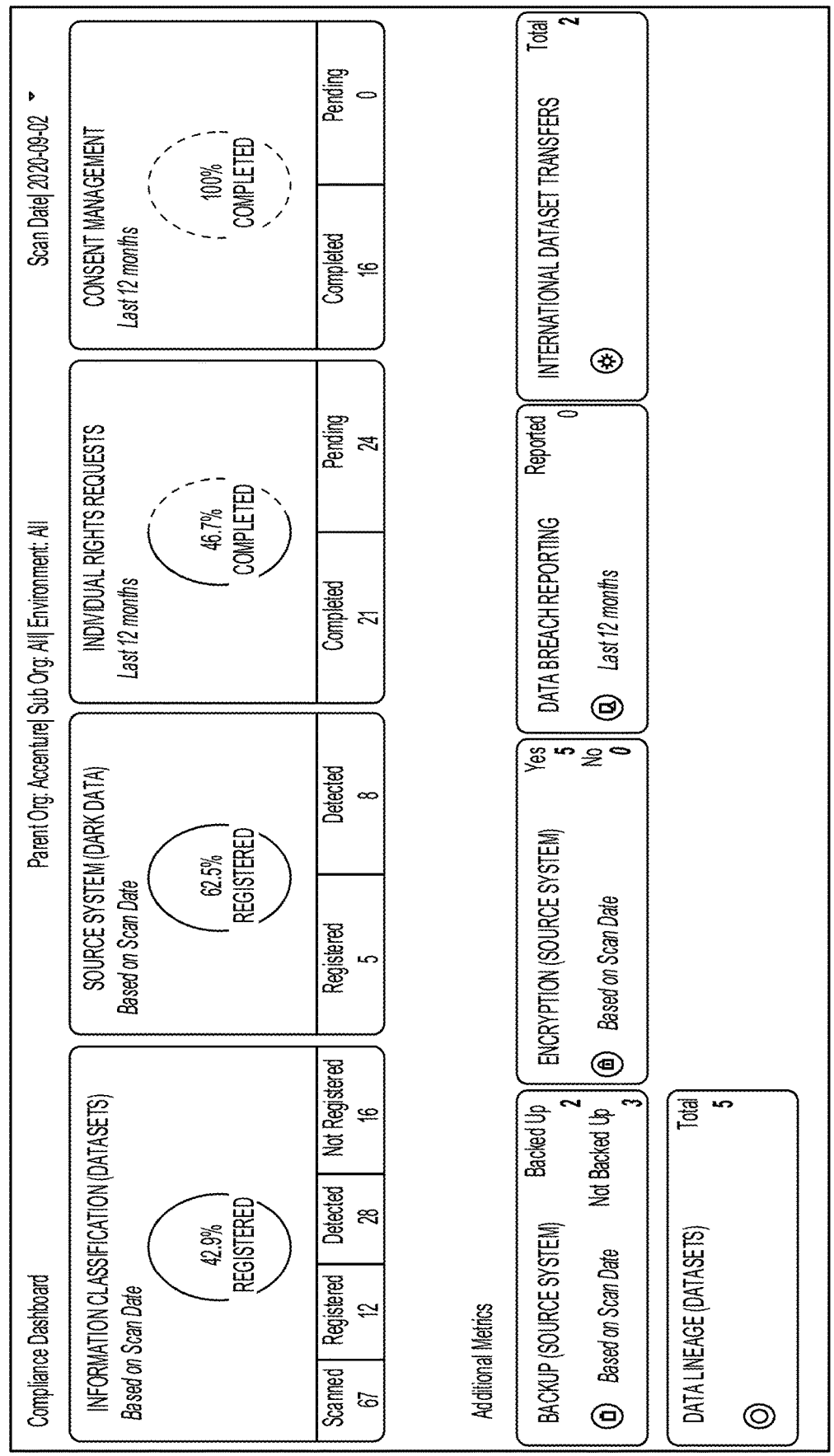
FIG. 3 shows an exemplary privacy data compliance dashboard in accordance with an embodiment.

FIG. 3 shows an exemplary privacy data compliance dashboard 300. The compliance dashboard 300 may, for example, include an organization's compliance to data privacy regulations including dark data source scanning for user privacy data, individual right request processing, and consent processing. As an example, the compliance dashboard 300 may include the number of registered data sources and the number of detected data sources. The registered data sources may include the data sources that have been scanned. The detected data sources may include both the data sources that have been scanned and the data sources that have not been scanned, i.e. dark data sources. Also, the compliance dashboard 300 may include backup status (backed up or not backed up) for all registered data sources, encryption status (encrypted or not encrypted) for all registered data sources, a total number of data breaches reported within the last twelve months, a total number of data transfers, and a total number of data lineage connections added to the data ecosystem.

FIG. 4 shows an exemplary compliance scanner 400, which may for example include scan status of dark data source for a subsidiary of the organization, including scan start time, scan end time, and scan duration. The compliance scanner 400 may further include selectable options to start a new scan, stop a scan, and schedule a scan. In an example, the scan may include pre-scan, partial scan, and full scan. The pre-scan may include, for example, scanning a newly detected dark data source to simply identify whether there is user privacy data in the dark data source. The partial scan may include, for example, scanning a data source to determine if the data source complies with a specific portion of applicable compliance rules such as user privacy data backup and encryption. The full scan may include, for example, scanning a data source to determine if the data source complies with all applicable compliance rules.

FIG. 5 shows an exemplary compliance backup status 500 for user privacy data in the data ecosystem of the organization, including the number of data sources that are backed up and the number of data sources that are not backed up.

FIG. 6 shows an exemplary activity log 600 of the user privacy data governance system which can be viewed by date.

Figure 7:
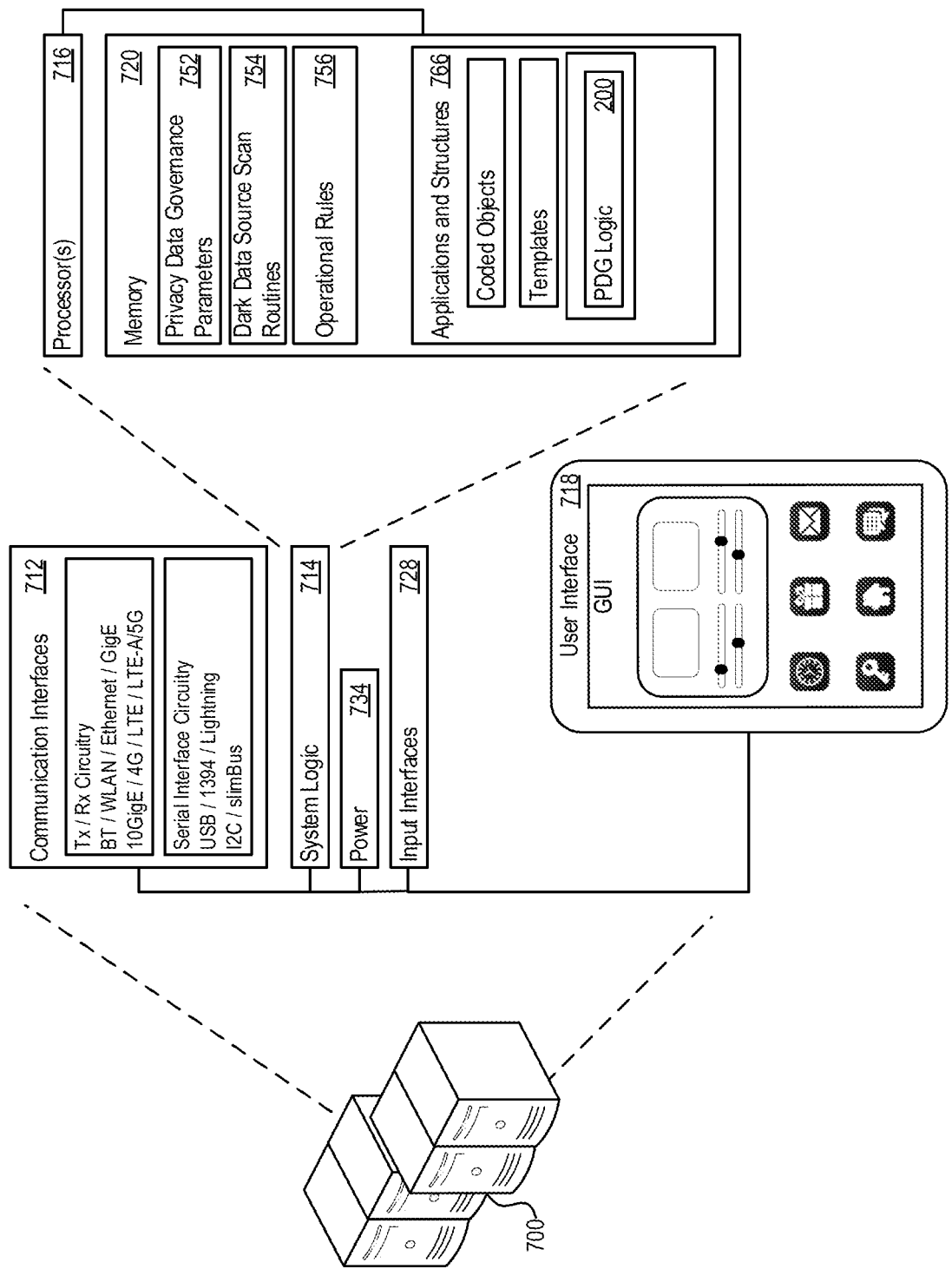
FIG. 7 illustrates an example execution environment for the privacy data governance system.

FIG. 7 shows an example system execution environment 700 for the PDG stack 100 described above. The execution environment 700 may include system logic 714 to support execution of the multiple layers of PDG stack 100 described above. The system logic may include processors 716, memory 720, and/or other circuitry.

The memory 720 may include privacy data governance parameters 752, dark data source scan routines 754, and operational rules 756. The memory 720 may further include applications and structures 766, for example, coded objects, machine instructions, templates, or other structures to support detecting dark data source, scanning dark data source to identify user privacy data, detecting non-compliance in protecting the user privacy data, processing the user privacy data to eliminate the non-compliance, or other tasks described herein. The applications and structures 766 may implement at least part of the PDG logic 200.

The execution environment 700 may also include network interface circuitry 712, which may support wireless, e.g. Bluetooth, Wi-Fi, WLAN, cellular (4G, LTE/A, 5G), and/or wired, Ethernet, Gigabit Ethernet, optical networking protocols. The network interface circuitry 712 may also include serial interfaces, such as universal serial bus (USB), serial ATA, IEEE 1394, lighting port, I²C, slimBus, or other serial interfaces. The network interface circuitry 712 may be used to support and/or implement remote operation of the PDG-control interface 166. The execution environment 700 may include power functions 734 and various input interfaces 728. The execution environment may also include a user interface 718 that may include human-to-machine interface devices and/or graphical user interfaces (GUI). The user interface 718 may be used to support and/or implement local operation of the PDG-control interface 166. In various implementations, the system logic 714 may be distributed over one or more physical servers, be implemented as one or more virtual machines, be implemented in container environments such as Cloud Foundry or Docker, and/or be implemented in serverless (functions as-a-Service) environments.

In some cases, the execution environment 700 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the PDG stack 100, of the execution environment onto the hardware resources. In some cases, a manifest may be stored as a preference file such as a YAML (yet another mark-up language), JSON, or other preference file type. Additionally or alternatively, the manifest may include custom scripts to implement the PDG stack 100 in a serverless environment. Therein, a multiple-tier framework is described. The framework describes a series of the serverless tasks controlled via scripts. The serverless tasks overlap in execution to maintain continuity across the tasks. The computational task is divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible service resource unit medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

We claim:

1. A method for governing user privacy data, comprising:
   scanning, by a processor circuitry, a data ecosystem according to a predetermined scan time interval to identify a newly added data source in the data ecosystem, the data ecosystem comprising a plurality of data sources storing user privacy data, the newly added data source comprising a plurality of datasets;
   determining, by the processor circuitry, the newly added data source as a dark data source in response to it being unknown whether user privacy data is stored in the newly added data source;
   identifying, by the processor circuitry, user information and relationship from the data ecosystem according to a lineage of the plurality of datasets;
   scanning, with the processor circuitry, the dark data source by executing a natural language processing engine to identify existence of and content of user privacy data in the dark data source based on the user information and relationship;
   selecting, by the processor circuitry, a target user privacy data compliance policy from a plurality of user privacy data compliance policies based on a geographical region associated with the dark data source;
   detecting, by the processor circuitry, non-compliance in protecting user privacy data in the dark data source based on the target user privacy data compliance policy; and
   in response to the non-compliance, processing, by the processor circuitry, the user privacy data in the dark data source to eliminate the non-compliance.

2. The method of claim 1, further comprising:
   determining the geographical region associated with the dark data source based on a geographical location where the dark data source is physically stored or a geographical location where the dark data source is accessed.

3. The method of claim 1, where the non-compliance comprises a failure to backup user privacy data, the processing the user privacy data to eliminate the non-compliance comprises:

identifying a dataset including the user privacy data from the dark data source; and
generating a backup dataset for the dataset including the user privacy data.

4. The method of claim 1, where the non-compliance comprises a failure to encrypt or mask user privacy data, the processing the user privacy data to eliminate the non-compliance comprises:
identifying a dataset including the user privacy data for the dark data source; and
encrypting or masking the dataset including the user privacy data.

5. The method of claim 1, further comprising:
receiving an individual right request for a user privacy data;
searching the dark data source to identify a dataset to which the individual right request is applicable;
executing operation on the dataset according to the individual right request; and
validating a completion of the individual right request.

6. The method of claim 1, further comprising:
determining a consent opt-out date for a user privacy data based on a consent opt-in request for the user privacy data, a consent opt-in granting an access to the user privacy data and a consent opt-out withdrawing an access grant to the user privacy data; and
generating a consent opt-out request for the user privacy data based on the opt-out consent date.

7. The method of claim 1, further comprising:
receiving an operation request for a user privacy data from a request source; and
in response to the request source being withdrawn access permission to the user privacy data, removing the user privacy data from a dataset to which the operation request is directed.

8. The method of claim 1, further comprising generating a report on compliance and non-compliance in protecting the user privacy data in the dark data source.

9. A system for governing user privacy data, comprising:
a memory having stored thereon executable instructions;
a processor circuitry in communication with the memory, the processor circuitry when executing the instructions configured to:
scan a data ecosystem according to a predetermined scan time interval to identify a newly added data source in the data ecosystem, the data ecosystem comprising a plurality of data sources storing user privacy data, the newly added data source comprising a plurality of datasets;
determine the newly added data source as a dark data source in response to it being unknown whether user privacy data is stored in the newly added data source;
identify user information and relationship from the data ecosystem according to a lineage of the plurality of datasets;
scan the dark data source by executing a natural language processing engine to identify existence of and content of user privacy data in the dark data source based on the user information and relationship;
select a target user privacy data compliance policy from a plurality of user privacy data compliance policies based on a geographical region associated with the dark data source;
detect non-compliance in protecting user privacy data in the dark data source based on the target user privacy data compliance policy; and
in response to the non-compliance, process the user privacy data in the dark data source to eliminate the non-compliance.

10. The system of claim 9, where the non-compliance comprises a failure to backup user privacy data, the processor circuitry when executing the instructions is configured to:
identify a dataset including the user privacy data from the dark data source; and
generate a backup dataset for the dataset including the user privacy data.

11. The system of claim 9, where the non-compliance comprises a failure to encrypt or mask user privacy data, the processor circuitry when executing the instructions is configured to:
identify a dataset including the user privacy data for the dark data source; and
encrypt or mask the dataset including the user privacy data.

12. The system of claim 9, the processor circuitry when executing the instructions is further configured to:
determine the geographical region associated with the dark data source based on a geographical location where the dark data source is physically located or a geographical location where the dark data source is accessed.

13. The system of claim 9, the processor circuitry when executing the instructions is further configured to:
receive an operation request for a user privacy data;
search the dark data source to identify a dataset to which the operation request is applicable;
execute operation on the dataset according to the operation request; and
validate a completion of the operation request.

14. The system of claim 9, the processor circuitry when executing the instructions is further configured to:
determining a consent opt-out date for a user privacy data based on a consent opt-in request for the user privacy data, a consent opt-in granting an access to the user privacy data and a consent opt-out withdrawing an access grant to the user privacy data; and
generating a consent opt-out request for the user privacy data based on the opt-out consent date.

15. The system of claim 9, the processor circuitry when executing the instructions is further configured to:
receive an operation request for a user privacy data from a request source; and
in response to the request source being withdrawn access permission to the user privacy data, remove the user privacy data from a dataset to which the operation request is directed.

16. The system of claim 9, where the processor circuitry when executing the instructions is further configured to:
generate reports on compliance and non-compliance in protecting the user privacy data in the dark data source.

17. A product including:
machine-readable media other than a transitory signal; and
instructions stored on the machine-readable media, the instructions configured to, when executed, cause a processor circuitry to:
scan a data ecosystem according to a predetermined scan time interval to identify a newly added data source in the data ecosystem, the data ecosystem comprising a plurality of data sources storing user privacy data, the newly added data source comprising a plurality of datasets;

determine the newly added data source as a dark data source in response to it being unknown whether user privacy data is stored in the newly added data source;

identify user information and relationship from the data ecosystem according to lineage of the plurality of datasets;

scan the dark data source by executing a natural language processing engine to identify user privacy data in the dark data source based on the user information and relationship;

select a target user privacy data compliance policy from a plurality of user privacy data compliance policies based on a geographical region associated with the dark data source;

detect non-compliance in protecting user privacy data in the dark data source based on the target user privacy data compliance policy; and in response to the non-compliance, process the user privacy data in the dark data source to eliminate the non-compliance.

18. The product of claim 17, where the instructions are further configured to cause the processor circuitry to:

determine the geographical region associated with the dark data source based on a geographical location where the dark data source is physically located or a geographical location where the dark data source is accessed.

\* \* \* \* \*